(12) United States Patent
Yao et al.

(10) Patent No.: US 7,609,487 B2
(45) Date of Patent: Oct. 27, 2009

(54) THIN-FILM PZT MICRO-ACTUATOR INTEGRAL WITH SUSPENSION OF HEAD GIMBAL ASSEMBLY, AND DISK DRIVE UNIT WITH THE SAME

(75) Inventors: MingGao Yao, DongGuan (CN); LiYan Zhu, HongKong (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 422 days.

(21) Appl. No.: 11/385,704

(22) Filed: Mar. 22, 2006

(65) Prior Publication Data
US 2007/0109690 A1 May 17, 2007

(30) Foreign Application Priority Data
Nov. 16, 2005 (CN) .................. 2005 1 0119000

(51) Int. Cl.
*G11B 21/10* (2006.01)
(52) U.S. Cl. .................................... 360/294.1
(58) Field of Classification Search ............... 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,950,266 B1 | 9/2005 | McCaslin et al. | |
| 7,298,593 B2 * | 11/2007 | Yao et al. ................. | 360/294.4 |
| 2001/0038515 A1 * | 11/2001 | Koganezawa et al. .... | 360/294.4 |

(Continued)

FOREIGN PATENT DOCUMENTS

CN        1632865 A        6/2005

(Continued)

OTHER PUBLICATIONS

U.S. Appl. No. 11/238,988, filed Sep. 2005, Yang et al.

(Continued)

*Primary Examiner*—Mark Blouin
(74) *Attorney, Agent, or Firm*—Nixon & Vanderhye PC

(57) ABSTRACT

A micro-actuator for a head gimbal assembly includes a support structure and a PZT element. The support structure includes a bottom support integrated with a suspension flexure of the head gimbal assembly, a top support adapted to support a slider of the head gimbal assembly, and a leading beam that couples the bottom support and the top support. The leading beam includes a weak point that allows the top support to rotate about a rotational axis in use. The PZT element is mounted between the top and bottom supports. The PZT element is excitable to cause selective rotational movement of the top support about the rotational axis in use.

45 Claims, 15 Drawing Sheets

U.S. PATENT DOCUMENTS

| | | | |
|---|---|---|---|
| 2003/0147177 A1 | 8/2003 | Yao et al. | |
| 2003/0147181 A1 | 8/2003 | Shiraishi et al. | |
| 2004/0095685 A1* | 5/2004 | Kuwajima et al. | 360/294.4 |
| 2004/0120081 A1 | 6/2004 | Kurihara et al. | |
| 2005/0117262 A1* | 6/2005 | Yao et al. | 360/294.4 |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |
| 2006/0256479 A1* | 11/2006 | Yao et al. | 360/294.4 |

FOREIGN PATENT DOCUMENTS

| | | |
|---|---|---|
| JP | 2002-74871 | 3/2002 |
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

\* cited by examiner

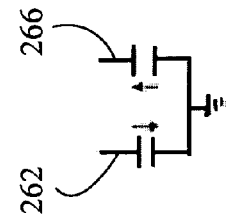
Fig. 13a
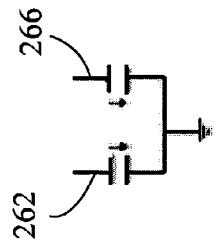
Fig. 15a
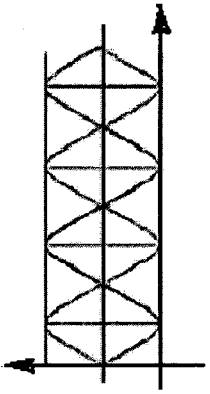
Fig. 13b
Fig. 15b
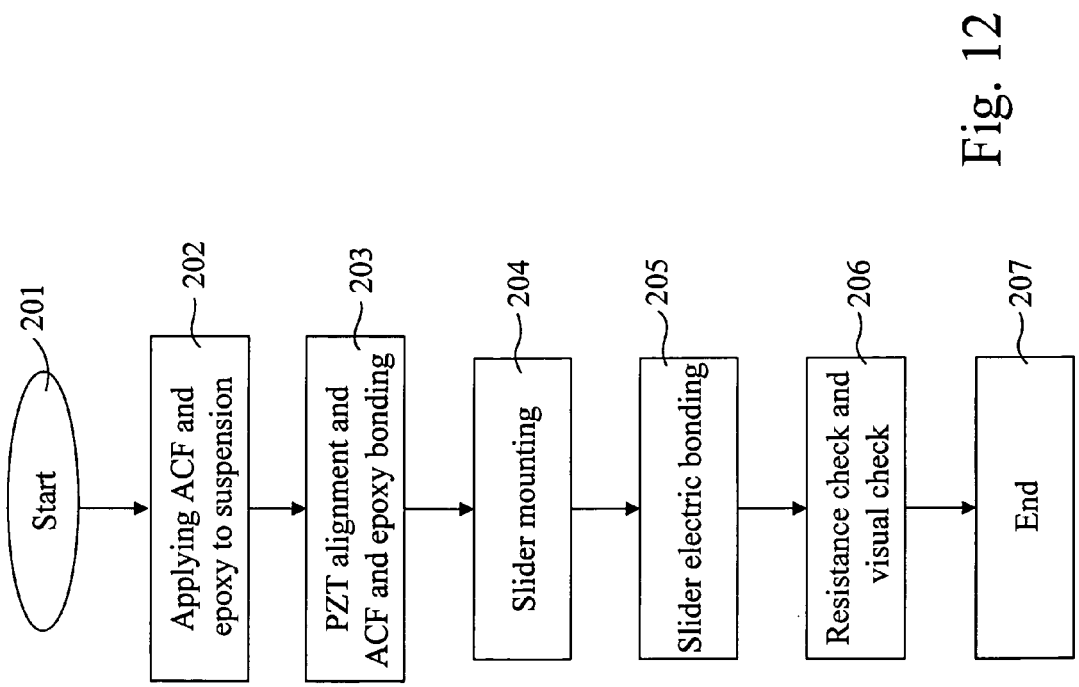
Fig. 12

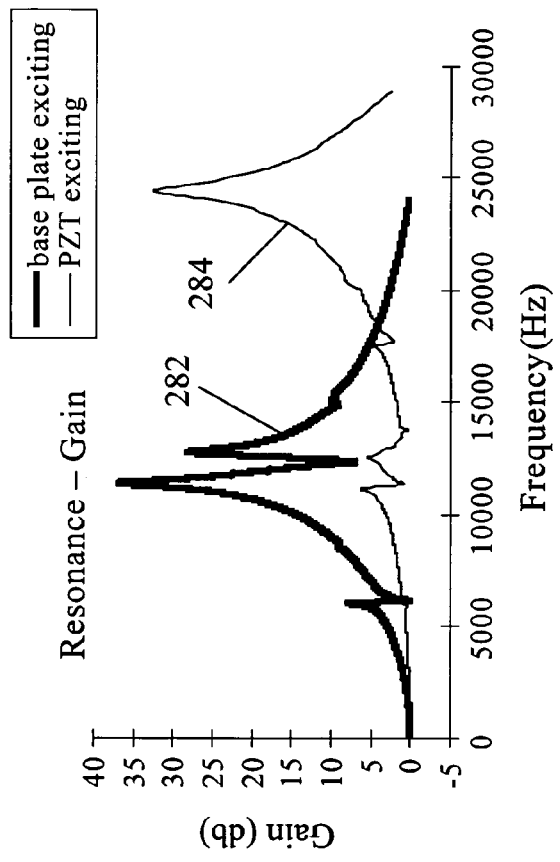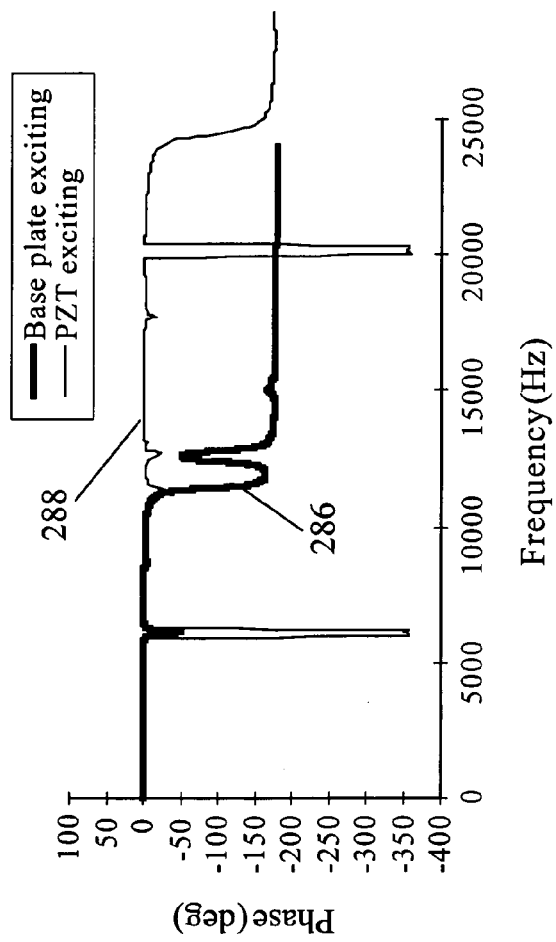
Fig. 16
Fig. 17

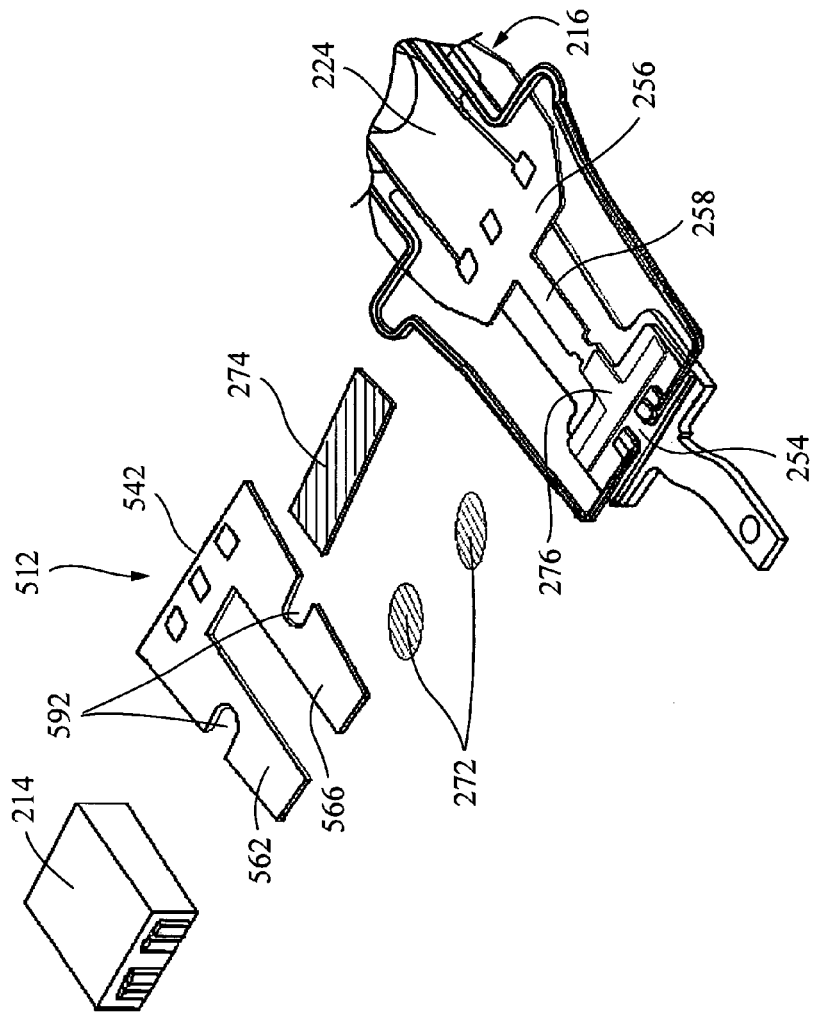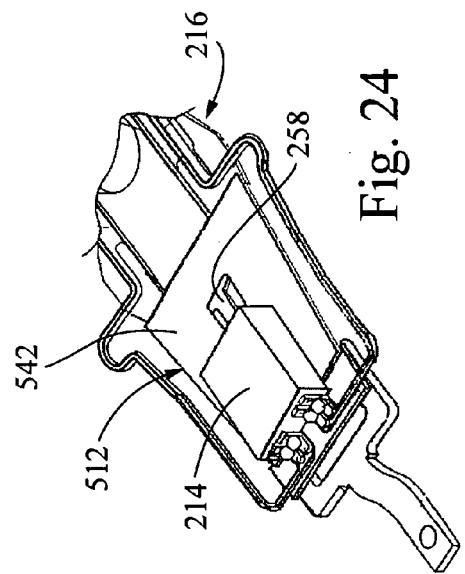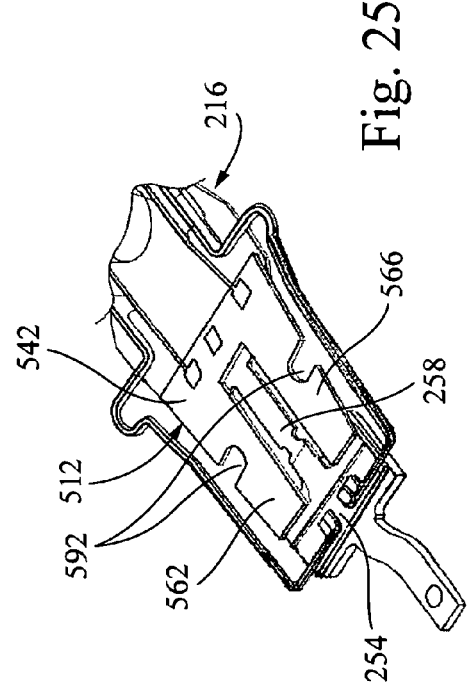

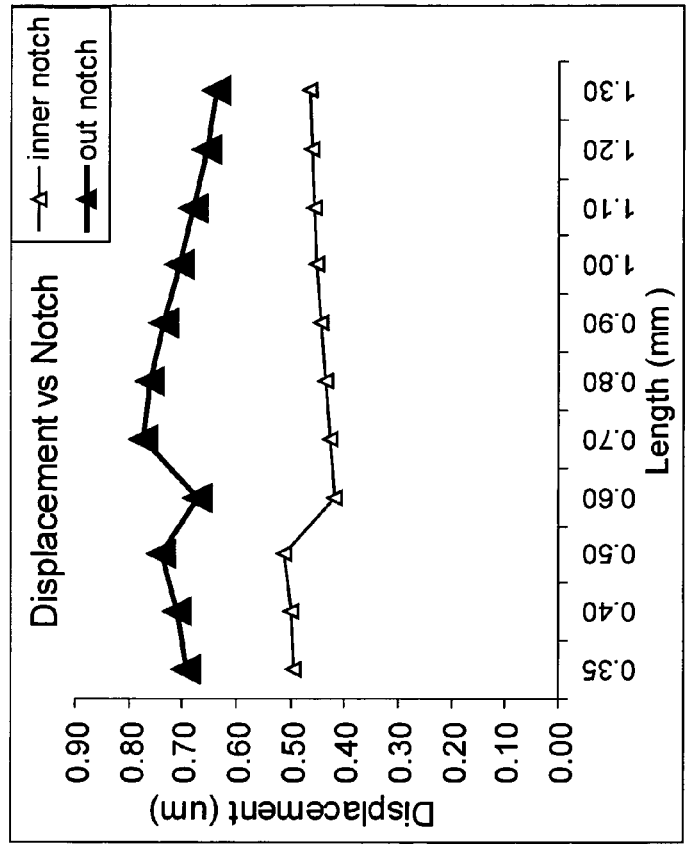
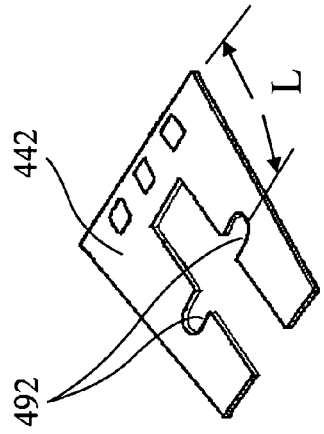
Fig. 27a
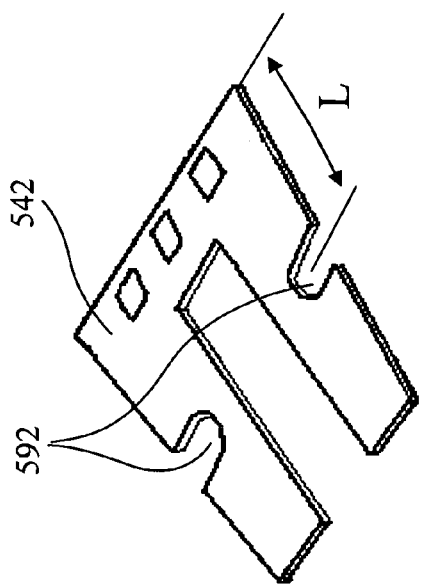
Fig. 27b
Fig. 27c

THIN-FILM PZT MICRO-ACTUATOR INTEGRAL WITH SUSPENSION OF HEAD GIMBAL ASSEMBLY, AND DISK DRIVE UNIT WITH THE SAME

FIELD OF THE INVENTION

The present invention relates to information recording disk drive units and, more particularly, to a micro-actuator for a head gimbal assembly (HGA) of the disk drive unit.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) 115 is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write head, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

Because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the vibration or resonance tolerance of the VCM and/or head suspension assembly due to manufacturing tolerances. The micro-actuator 105 enables, for example, the use of a smaller recording track width, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

FIGS. 3 and 4 illustrate a PZT micro-actuator disclosed in U.S. Patent Application Publication No. US 2003/0168935. As illustrated, a slider 133 (containing a read/write sensor) is partially mounted on a slider support 121 of the suspension 120. A bump 127 is formed on the slider support 121 to support the center of the back surface of the slider 133. A flex cable 122 including a plurality of traces is coupled to the slider support 121 and a metal base flexure part 123. A suspension load beam 124 with a gimbal 125 is provided to support the slider support 121 and flexure part 123. The gimbal 125 of the suspension load beam 124 supports the bump 127 of the slider support 121. This arrangement ensures that the load force from the load beam 124 is always applied to the center of the slider 133 when the slider 133 is flying on the disk.

Two thin-film PZT pieces 140, 142 are attached to the tongue region 128 of the flex cable 122 so that the thin-film PZT pieces 140, 142 are partially positioned under the slider 133. When a voltage is input to the two thin-film PZT pieces 140, 142, one of PZT pieces may contract C and the other PZT piece may expand E. This movement will generate a rotational torque T to the slider support 121. Since the slider 133 is partially mounted to the slider support 121 and the bump 127 of the slider support 121 supports the center of the slider 133, the slider 133 and the slider support 121 will rotate against the gimbal 125 of the suspension load beam 124.

Because the slider support 121 and the load beam 124 are constructed from metal materials, the metal material of the bump 127 engages the metal material of the gimbal 125 and creates substantial rubbing between the bump 127 and the gimbal 125 in use. This rubbing will cause a reliability failure. Also, this rubbing will generate metal particles which may cause serious damage to the slider 133, the disk, or both, and therefore damage the disk drive unit. In addition, the rubbing will have a big effect on the head dynamic performance.

Another disadvantage of the prior design is the shock performance. Specifically, the slider 133 is partially mounted on the slider support 121, and the slider support 121 is coupled with the flexure part 123 by the flex cable 122. This arrangement provides very poor shock performance. As a result, the suspension 120 or thin-film PZT pieces 140, 142 may be damaged, e.g., crack or break, when a vibration or shock event occurs.

Thus, there is a need for an improved system that does not suffer from the above-mentioned drawbacks.

SUMMARY OF THE INVENTION

One aspect of the present invention relates to a micro-actuator structured to provide fine head position adjustment and high shock performance.

Another aspect of the present invention relates to a micro-actuator that is integrated with the suspension flexure of the HGA.

Another aspect of the invention relates to a micro-actuator for a head gimbal assembly. The micro-actuator includes a support structure and a PZT element. The support structure includes a bottom support integrated with a suspension flexure of the head gimbal assembly, a top support adapted to support a slider of the head gimbal assembly, and a leading beam that couples the bottom support and the top support. The leading beam includes a weak point that allows the top support to rotate about a rotational axis in use. The PZT element is mounted between the top and bottom supports. The PZT element is excitable to cause selective rotational movement of the top support about the rotational axis in use.

Another aspect of the invention relates to a head gimbal assembly including a micro-actuator, a slider, and a suspension including a suspension flexure. The micro-actuator includes a support structure and a PZT element. The support structure includes a bottom support integrated with the suspension flexure, a top support that supports the slider, and a leading beam that couples the bottom support and the top support. The leading beam includes a weak point that allows the top support to rotate about a rotational axis in use. The PZT element is mounted between the top and bottom supports. The PZT element is excitable to cause selective rotational movement of the top support about the rotational axis in use.

Another aspect of the invention relates to a disk drive device including a head gimbal assembly, a drive arm connected to the head gimbal assembly, a disk, and a spindle motor operable to spin the disk. The head gimbal assembly includes a micro-actuator, a slider, and a suspension including a suspension flexure. The micro-actuator includes a support structure and a PZT element. The support structure includes a bottom support integrated with the suspension flexure, a top support that supports the slider, and a leading beam that couples the bottom support and the top support. The leading beam includes a weak point that allows the top support to rotate about a rotational axis in use. The PZT element is mounted between the top and bottom supports. The PZT element is excitable to cause selective rotational movement of the top support about the rotational axis in use.

Another aspect of the invention relates to a head gimbal assembly including a micro-actuator, a slider, and a suspension including a suspension flexure. The micro-actuator includes a support structure and a PZT element. The support structure includes a bottom support integrated with the suspension flexure, a top support that supports the slider, and a leading beam that couples the bottom support and the top support. The leading beam includes a weak point that allows the top support to rotate about a rotational axis in use. The PZT element is mounted between the top and bottom supports. The PZT element is excitable to cause selective rotational movement of the top support about the rotational axis in use. The suspension includes a load beam having a dimple that engages the weak point of the leading beam. A center of the slider, the weak point, and the dimple are aligned along a common axis.

Yet another aspect of the invention relates to a method for manufacturing a head gimbal assembly. The method includes integrating a micro-actuator support structure to a suspension flexure, applying a bonding material to the micro-actuator support structure, aligning a PZT element with the micro-actuator support structure, bonding the PZT element to the micro-actuator support structure by the bonding material to physically and electrically connect the PZT element to suspension traces provided on the micro-actuator support structure, mounting a slider to the micro-actuator support structure, electrically connecting the slider to suspension traces provided on the micro-actuator support structure, and performing a resistance check and a visual check.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 12 is a flow chart illustrating a manufacturing and assembly process according to an embodiment of the present invention;

FIG. 13a illustrates an embodiment of the electrical connection structure between PZT elements of the PZT micro-actuator shown in FIG. 5;

FIG. 13b illustrates a voltage applied to the PZT elements of the PZT micro-actuator shown in FIG. 5;

FIG. 15a illustrates another embodiment of the electrical connection structure between PZT elements of the PZT micro-actuator shown in FIG. 5;

FIG. 15b illustrates another voltage applied to the PZT elements of the PZT micro-actuator shown in FIG. 5;

FIG. 16 shows testing data of the resonance gain of the PZT micro-actuator shown in FIG. 5;

FIG. 17 shows testing data of the resonance phase of the PZT micro-actuator shown in FIG. 5;

FIG. 24 is a partial perspective view of a HGA including a PZT micro-actuator according to another embodiment of the present invention;

FIG. 25 is a partial perspective view of the HGA shown in FIG. 24 with the slider removed;

FIG. 26 is an exploded view of the HGA shown in FIG. 24;

FIG. 27a is a perspective view of a PZT element of the PZT micro-actuator shown in FIGS. 21-23;

FIG. 27b is a perspective view of a PZT element of the PZT micro-actuator shown in FIGS. 24-26;

FIG. 27c shows testing data of displacement versus notch location length for the PZT elements shown in FIGS. 27a and 27b;

DETAILED DESCRIPTION OF ILLUSTRATED EMBODIMENTS

Figure 1:
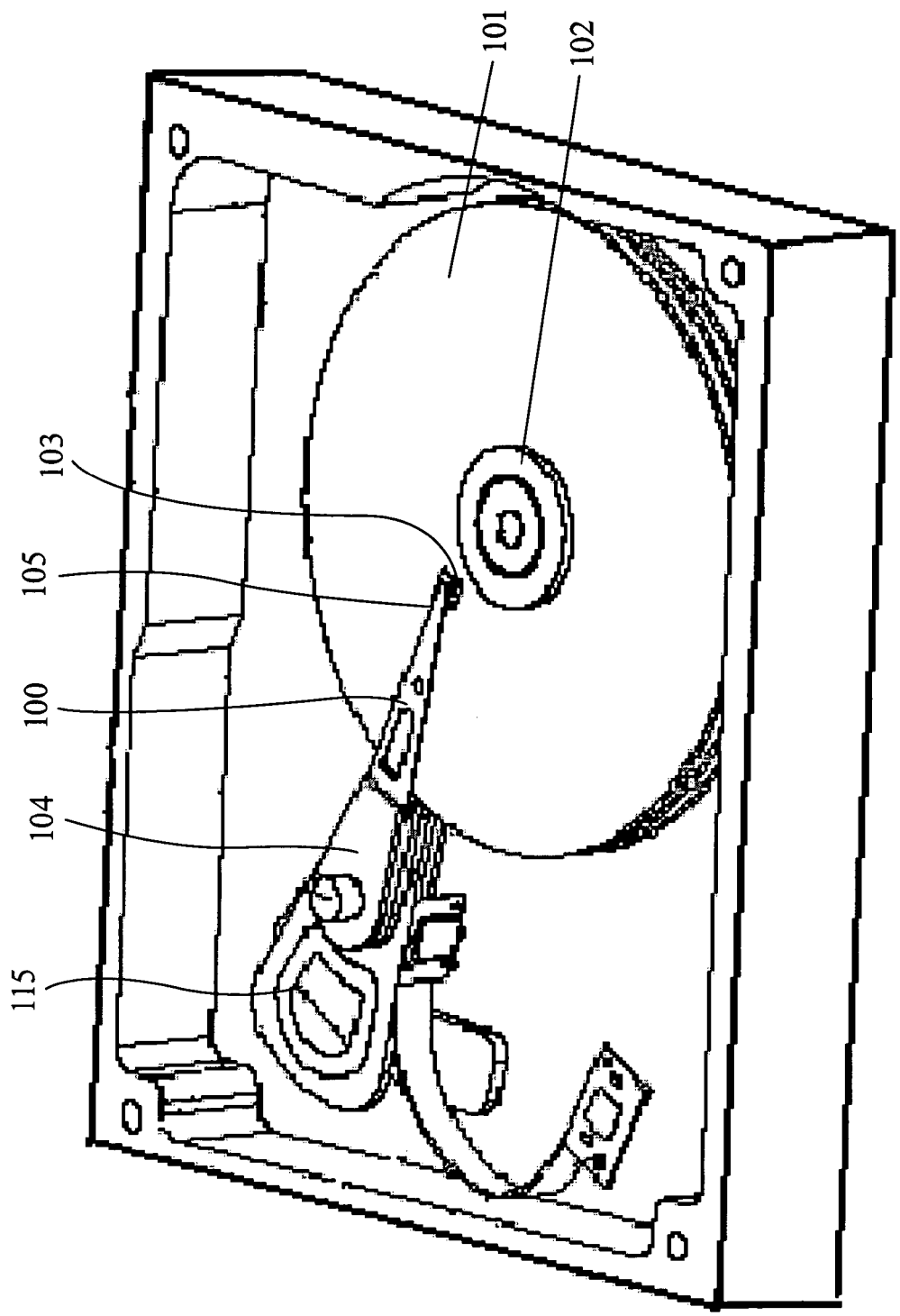
FIG. 1 is a perspective view of a conventional disk drive unit.
Figure 2:
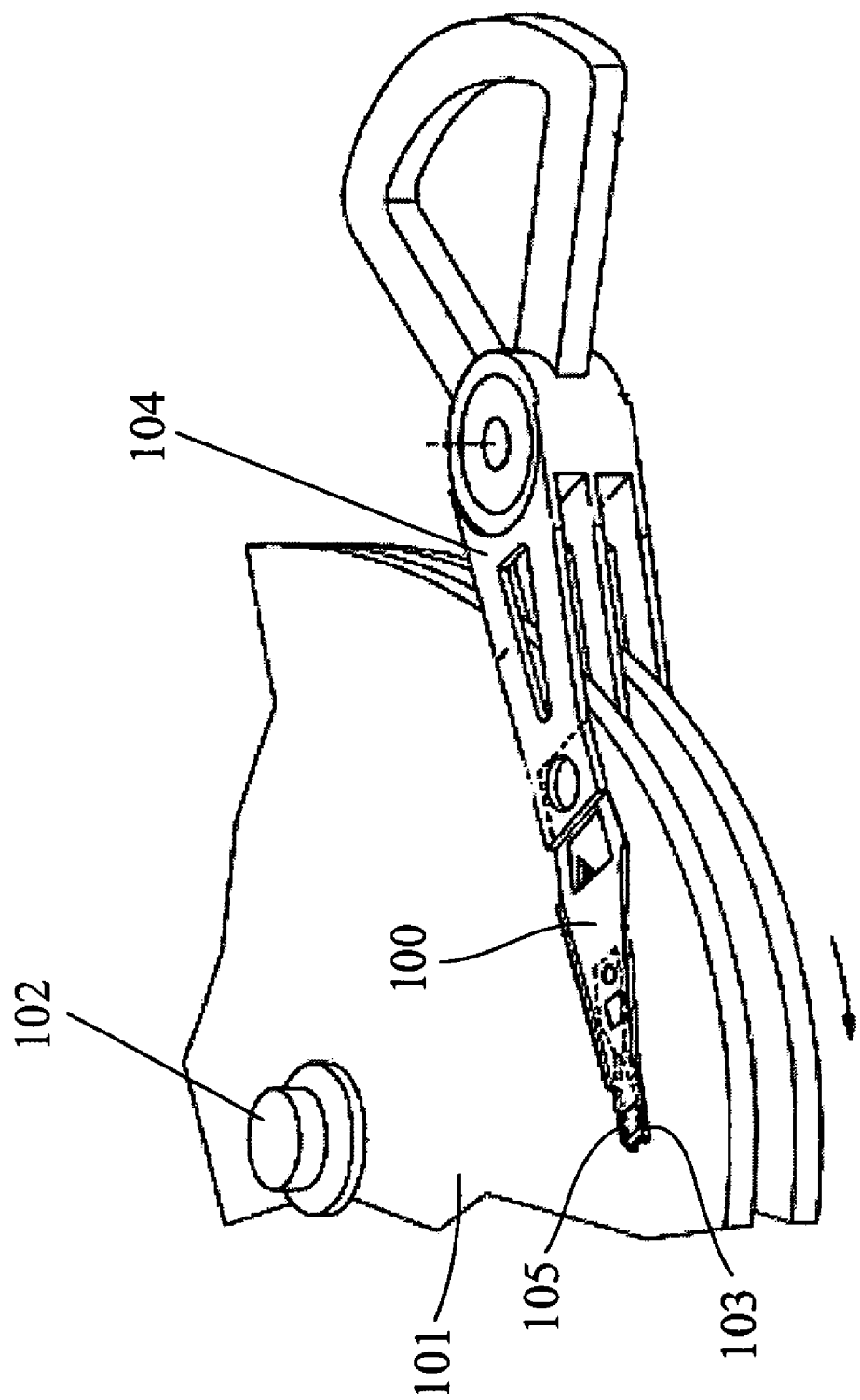
FIG. 2 is a partial perspective view of the conventional disk drive unit shown in FIG. 1.
Figure 4:
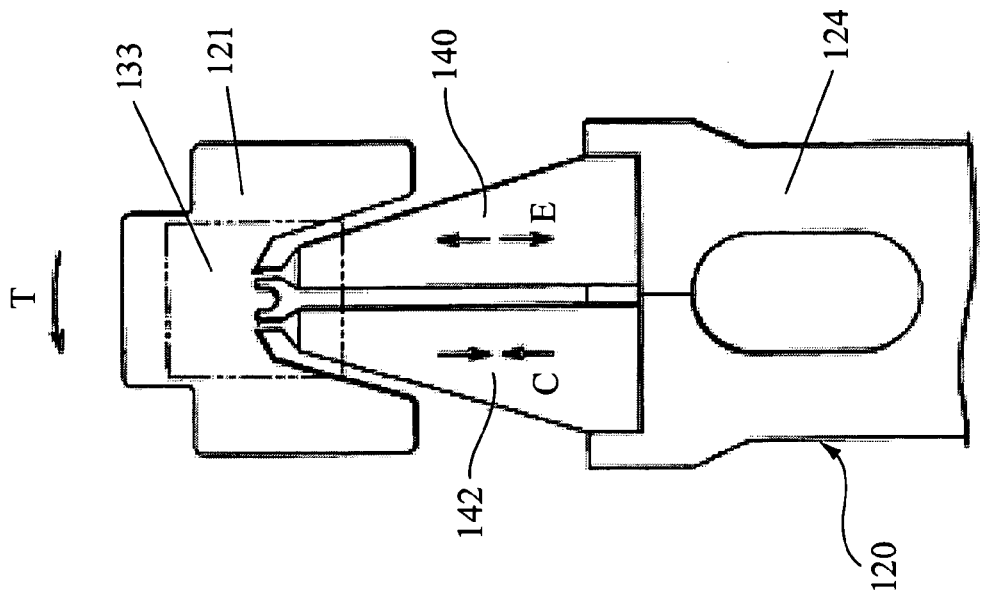
FIG. 4 is a top view of the known suspension and PZT micro-actuator shown in FIG. 3.
Figure 3:
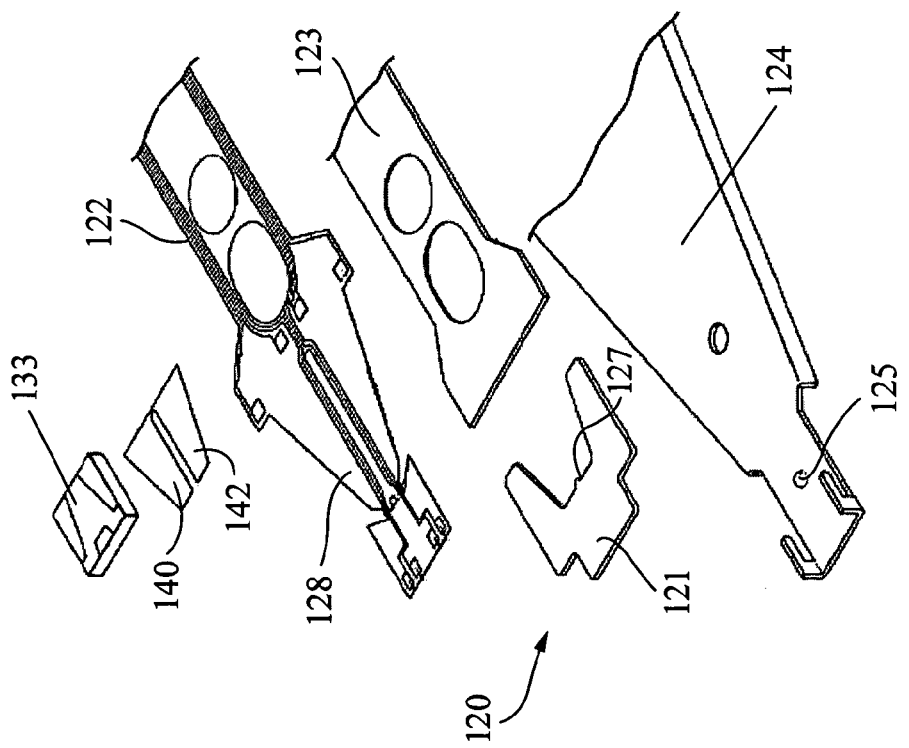
FIG. 3 is an exploded view of a known suspension and PZT micro-actuator.
Figure 6:
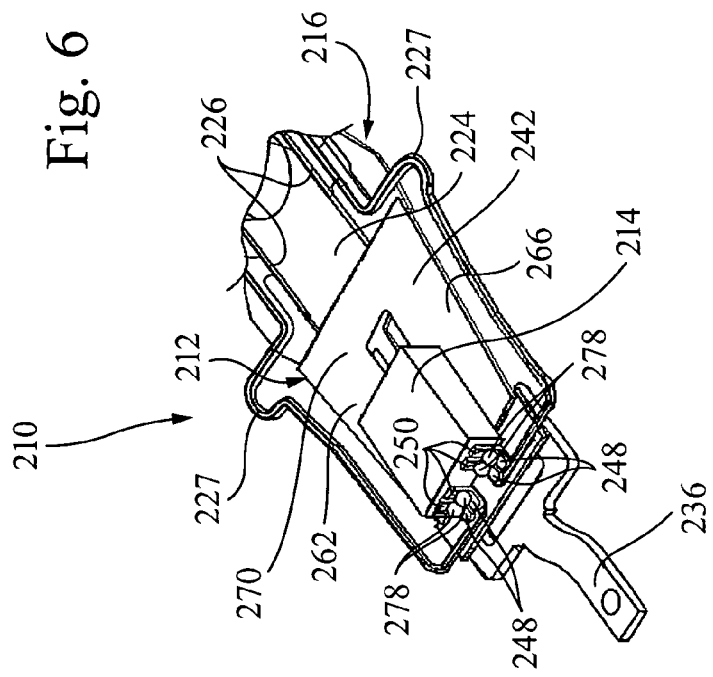
FIG. 6 is a partial perspective view of the HGA shown in FIG. 5.

Various preferred embodiments of the instant invention will now be described with reference to the figures, wherein like reference numerals designate similar parts throughout the various views. As indicated above, the instant invention is designed to improve shock and resonance performance in a head gimbal assembly (HGA) while precisely actuating the slider using the micro-actuator. An aspect of the instant invention is to provide a rotation-type PZT micro-actuator configured to improve shock and resonance performance in the HGA. By improving shock and resonance performance of the HGA, the performance characteristics of the disk drive device are improved.

Several example embodiments of a micro-actuator for a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 5-11 illustrate a head gimbal assembly (HGA) 210 incorporating a PZT micro-actuator 212 according to a first exemplary embodiment of the present invention. The HGA 210 includes a PZT micro-actuator 212, a slider or recording head 214, and a suspension 216. As described in greater detail below, the PZT micro-actuator 212 is integrated with the suspension 216 to load or support the slider 214.

Figure 5:
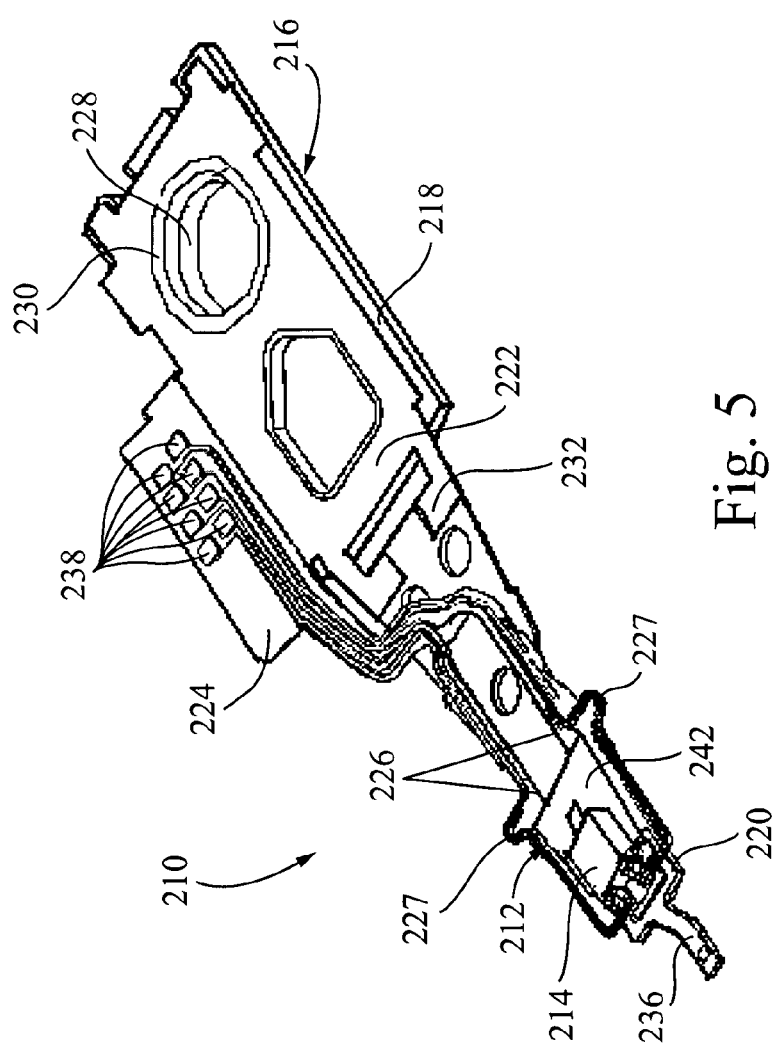
FIG. 5 is a perspective view of a head gimbal assembly (HGA) including a PZT micro-actuator according to an embodiment of the present invention.
Figure 7:
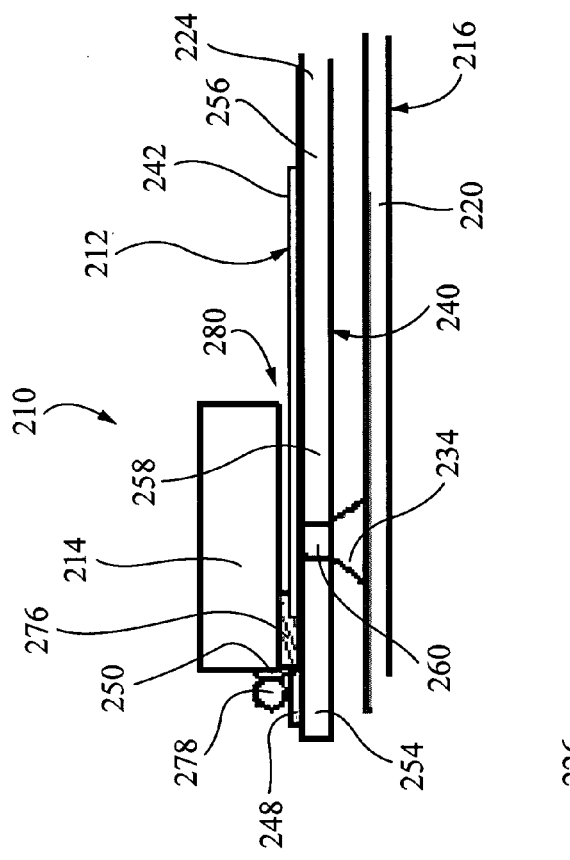
FIG. 7 is a side view of the HGA shown in FIG. 6.
Figure 8:
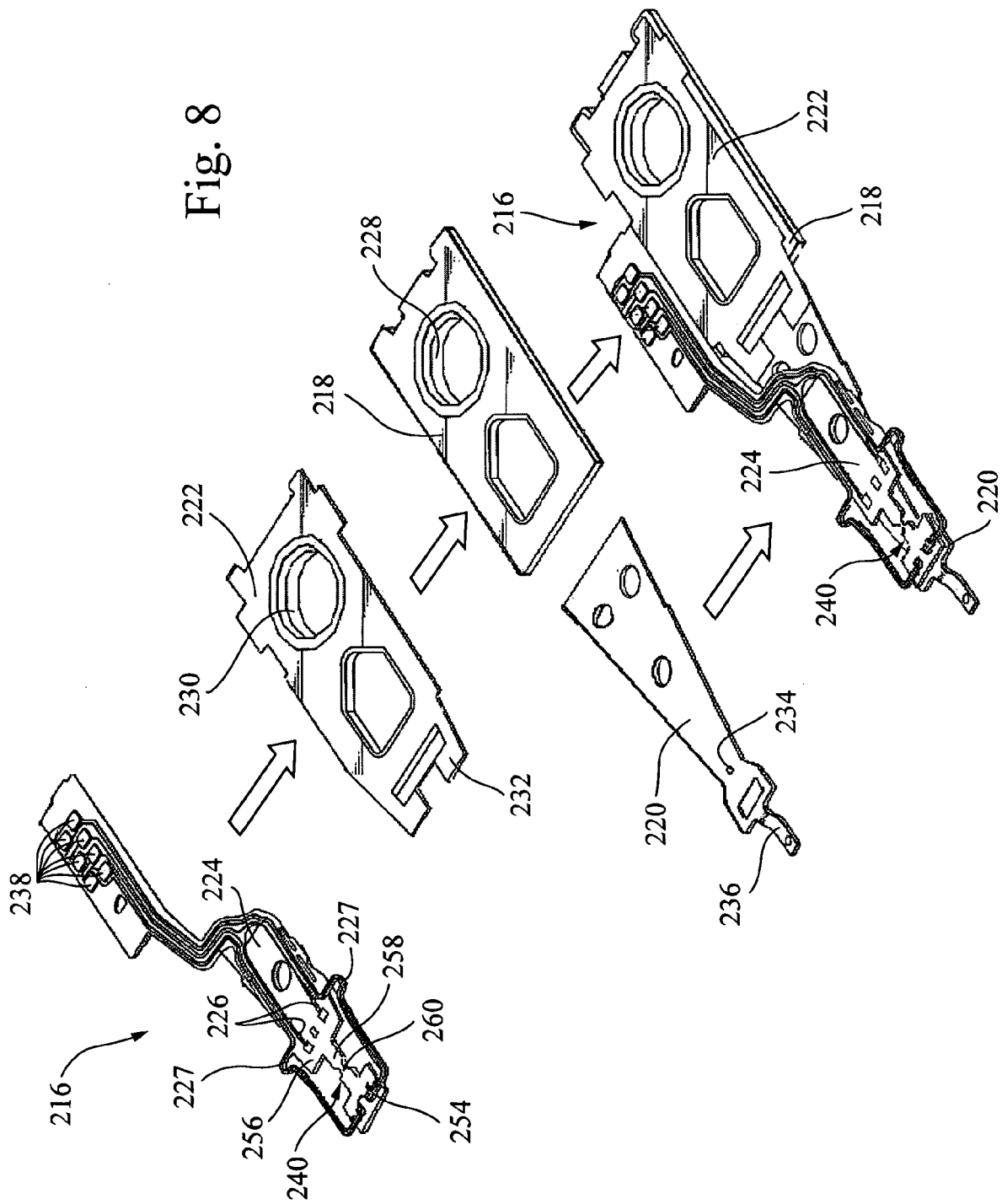
FIG. 8 is an exploded view of the suspension of the HGA shown in FIG. 5.

As best shown in FIGS. 5, 7, and 8, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by laser welding. As illustrated, the hinge 222 includes a hole 230 that aligns with the hole 228 provided in the base plate 218. Also, the hinge 222 includes a holder bar 232 for supporting the load beam 220.

The load beam 220 is mounted onto the holder bar 232 of the hinge 222, e.g., by laser welding. The load beam 220 has a dimple 234 formed thereon for engaging the PZT micro-actuator 212 (see FIG. 7). An optional lift tab 236 may be provided on the load beam 220 to lift the HGA 210 from the disk when the disk is not rotated.

The flexure 224 is mounted to the hinge 222 and the load beam 220, e.g., by laser welding. A support structure 240, e.g., formed of metal, of the PZT micro-actuator 212 is integrated with the flexure 224. The support structure 240 engages the dimple 234 on the load beam 220. Also, the support structure 240 supports the PZT element 242 and slider 214 on the suspension 216.

The suspension traces 226, 227 are provided on the flexure 224 to electrically connect a plurality of connection pads 238 (which connect to an external control system) with the slider 214 and the PZT element 242 of the PZT micro-actuator 212. The suspension traces 226, 227 may be a flexible printed circuit (FPC) and may include any suitable number of lines.

Figure 9:
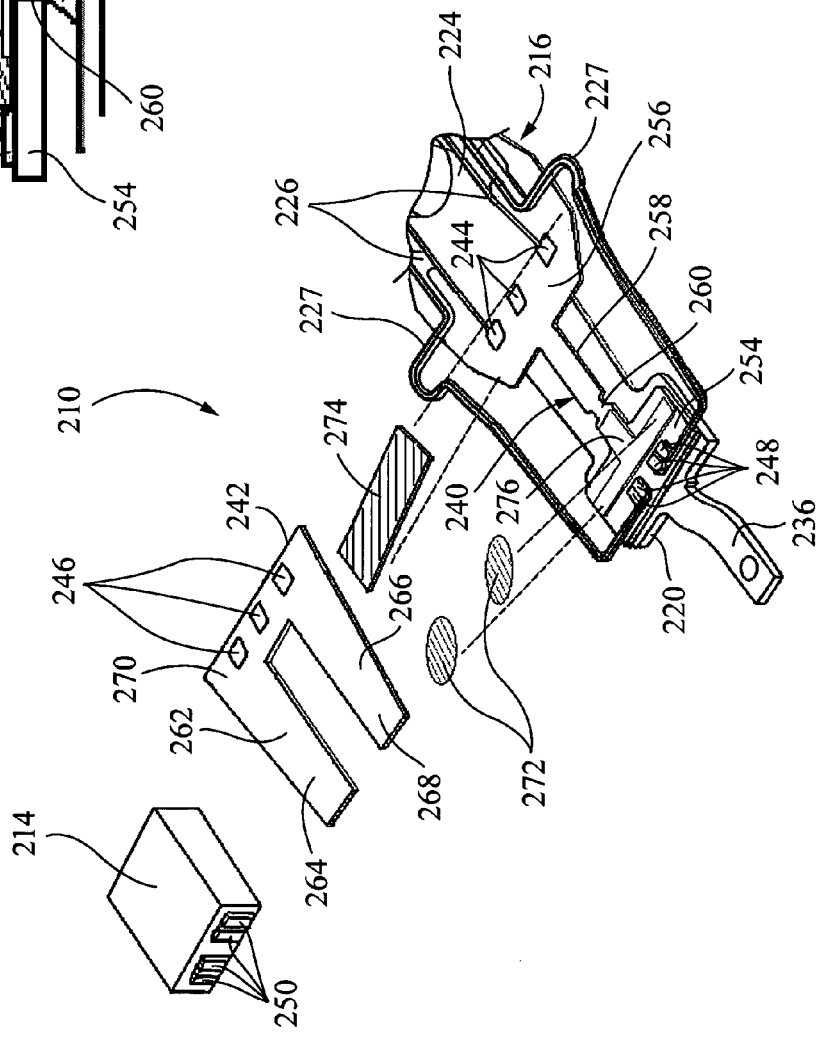
FIG. 9 is an exploded view of the HGA shown in FIG. 6.

As best shown in FIG. 9, bonding pads 244 are directly connected to the inner suspension traces 226 to electrically connect the inner suspension traces 226 with bonding pads 246 provided on the PZT element 242. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

As best shown in FIGS. 7, 9, 10, and 11, the PZT micro-actuator 212 includes the support structure 240 integrated with the flexure 224, and the PZT element 242 mounted to the support structure 240.

The support structure 240 includes a top part or support 254, a bottom part or support 256, and a leading beam or connection member 258 that couples the top support 254 to the bottom support 256. As illustrated, the bottom support 256 is integrated with the flexure 224 in the tongue area and mounted to the load beam 220, e.g., by laser welding. The leading beam 258 and the top support 254 define a T-shaped arrangement. Also, notches in the leading beam define a weak point 260 of the leading beam 258. The weak point 260 is aligned and engaged with the dimple 234 of the load beam 220 (see FIG. 7).

In the illustrated embodiment, the PZT element 242 includes two pieces of thin-film PZT that are coupled to one another to provide a one-piece structure. Specifically, the PZT element 242 includes a first thin-film PZT portion 262 that provides free end 264, a second thin-film PZT portion 266 that provides free end 268, and a coupling portion 270 that couples the first and second thin-film PZT portions 262, 266.

In another embodiment, the PZT element 242 may be another type of PZT material, such as single ceramic crystal material. The element 242 may also be PMN-PT single crystal film or other type crystal material. All materials with these functional properties may be used for this application.

Figure 11:
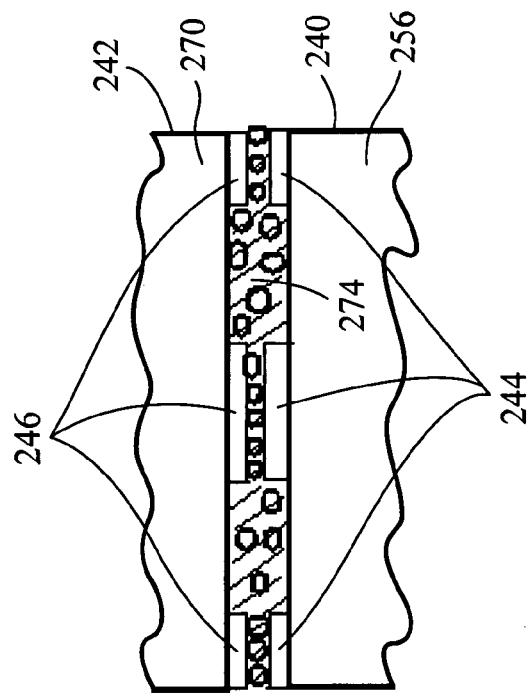
FIG. 11 is a cross-sectional view of the HGA shown in FIG. 10.
Figure 10:
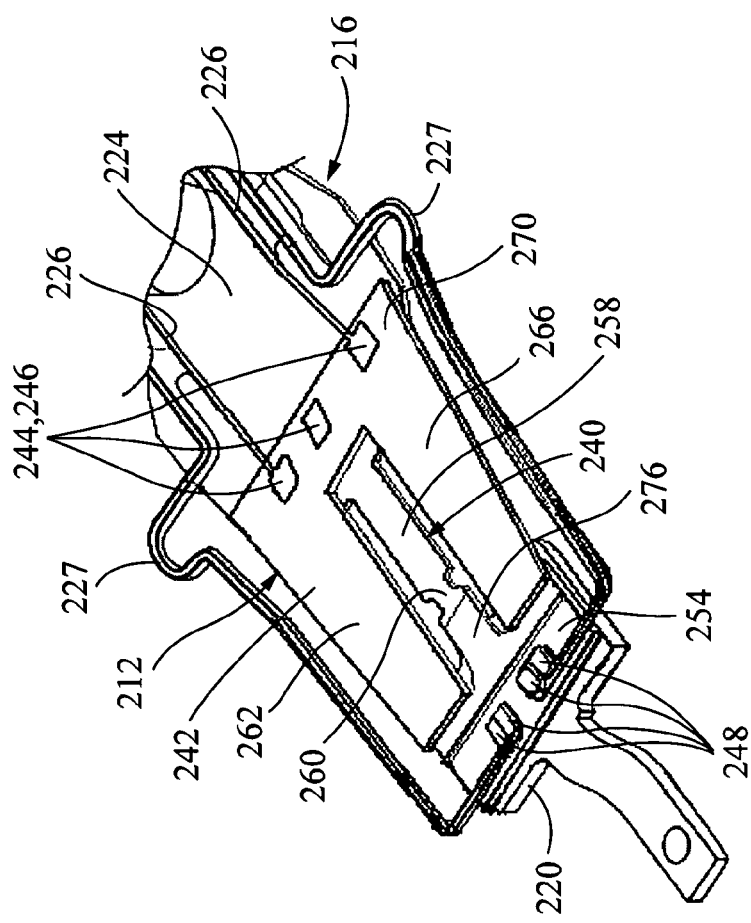
FIG. 10 is a partial perspective view of the HGA shown in FIG. 5 with the slider removed.

As best shown in FIGS. 9, 10, and 11, the PZT element 242 is mounted to the support structure 240 by mounting the free ends 264, 268 to the top support 254 and mounting the coupling portion 270 to the bottom support 256. As illustrated, the free ends 264, 268 are partially mounted to the top support 254 by epoxy dots 272, and the coupling portion 270 is partially mounted to the bottom support 256 by anisotropic conductive film (ACF) 274. However, other bonding methods are possible, e.g., adhesive, GBB, SBB, tape bonding, welding.

Moreover, multiple bonding pads 246, e.g., three pads, provided on the coupling portion 270 are electrically connected to respective bonding pads 244 on the inner suspension traces 226 using the ACF 274. Specifically, as best shown in FIG. 11, pressure is applied during the ACF bonding such that the metal material of the ACF 274 will electrically couple the pads 244, 246 and the resin material of the ACF 274 will physically couple the coupling portion 270 of the PZT element 242 with the bottom support 256 when heated during the bonding process. Thus, the PZT element 242 and the support structure 240 are physically and electrically coupled by the ACF 274. This allows power to be applied via the inner suspension traces 226 to the first and second PZT portions 262, 266 of the PZT element 242. In use, the middle ones of the pads 244, 246 function as a common ground. The PZT element 242 is preferably made of a thin-film PZT material which can have a single-layer structure or a multi-layer structure. In an embodiment, the element 242 may be single ceramic crystal material or PMN-PT single crystal film. In another embodiment, a ductile support material may be provided under the PZT element 242 to increase the shock performance.

As best shown in FIGS. 7, 9, and 10, the top support 254 is structured to connect the support structure 240 to the slider 214. Specifically, the top support 254 includes a T-shaped step 276 constructed of a polymer laminate. The T-shaped step 276 may have a thickness in the range of 10-30 µm. The slider 214 is partially mounted on the T-shaped step 276, e.g., by epoxy or adhesive. Moreover, multiple bonding pads 250, e.g., four bonding pads, provided on the slider 214 are electrically bonded with respective pads 248 provided on the top support 254 using, for example, electric connection balls (GBB or SBB) 278. However, other bonding methods are possible, e.g., tape bonding, welding. This connects the top support 254 to the slider 214 and electrically connects the slider 214 and its read/write elements to the outer suspension traces 227.

As shown in FIG. 7, when assembled, the center of the slider 214 is aligned with the weak point 260 of the leading beam 258, which is aligned with the dimple 234 of the load beam 220. Thus, the center of the slider 214, the weak point 260, and the dimple 234 are located or aligned along a common axis. Also, a parallel gap 280 is provided between the slider 214 and the PZT element 242 to allow the slider 214 to move freely in use.

That is, the slider 214 is mounted to the top support 254 such that the center axis of the slider 214 will substantially align with the center axis of the weak point 260 of the leading beam 258. Also, the support structure 240 is integrated with the flexure 224 such that the center axis of the weak point 260 will substantially align with the center axis of the dimple 234 of the load beam 220. This arrangement allows the slider 214 and top support 254 to freely rotate around the center axis of dimple 234 when the top support 254 is rotated by exciting the PZT element 242. The parallel gap 280 allows the slider 214 to rotate smoothly in use. This structure provides less stress translation to the suspension 216 and achieves good resonance transfer function characteristics.

FIG. 12 illustrates the primary steps involved in the manufacturing and assembly process of the HGA 210 according to an embodiment of the present invention. After the process starts (step 201), ACF 274 and epoxy 272 are applied to the support structure 240 integrated with the flexure 224 of the suspension 216 (step 202). The PZT element 242 is aligned with the support structure 240 and then bonded to the support structure 240 by the ACF 274 and epoxy 272 (step 203). This electrically couples the PZT element 242 with the inner suspension traces 226. Then, the slider 214 is mounted to the support structure 240 (step 204), and the slider 214 is electrically bonded with the outer suspension traces 227 (step 205). Finally, a resistance and visual check are performed (step 206) to complete the manufacturing and assembly process (step 207).

Figure 14C:
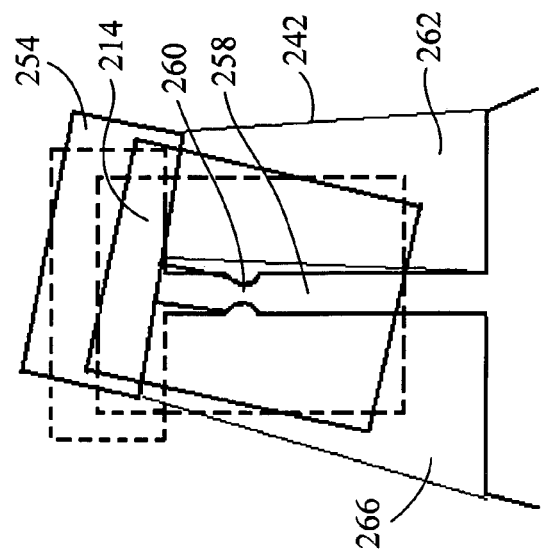
FIGS. 14b and 14c are top views of the slider and PZT micro-actuator of the HGA shown in FIG. 5 when a voltage is applied.
Figure 14B:
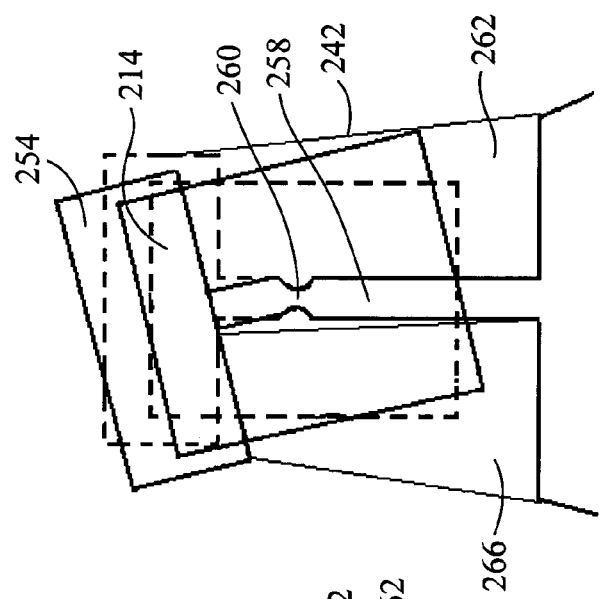
Figure 14A:
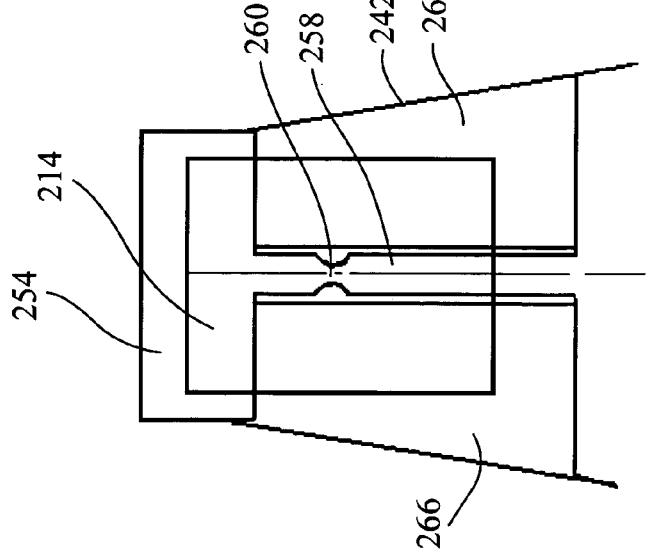
FIG. 14a is a top view of the slider and PZT micro-actuator of the HGA shown in FIG. 5 in a relaxed state.

FIGS. 13a, 13b, and 14a-14c illustrate an embodiment of an operation method of the PZT micro-actuator 212 for performing a position adjustment function. Specifically, FIG. 13a illustrates an embodiment of an electrical connection structure between the two PZT portions 262, 266 of the PZT micro-actuator 212, and FIG. 13b illustrates the operation voltage. As illustrated, the PZT portions 262, 266 have opposite polarization directions with a common ground. Also, a sine waveform voltage is applied to operate the PZT portions 262, 266. FIG. 14a illustrates the initial stage or original position of the PZT micro-actuator 212 and slider 214 when no voltage is applied to the PZT portions 262, 266 of the PZT micro-actuator 212. As shown in FIG. 14b, when the drive voltage goes to the first half period, the voltage increase causes the PZT portion 266 to shrink and the PZT portion 262 to extend. This movement of the PZT portions 262, 266 causes the top support 254 to rotate towards the left side about the weak point 260. Since slider 214 is partially mounted to the top support 254, the slider 214 will rotate towards the left side along with the top support 254. When the voltage is reduced, the top support 254 and slider 214 will rotate back to their original position of FIG. 14a. As shown in FIG. 14c, when the drive voltage goes to the second half period, the voltage increase (in the negative side) causes the PZT portion 266 to extend and the PZT portion 262 to shrink. This movement of the PZT portions 262, 266 causes the top support 254 to rotate towards the right side about the weak point 260. Since the slider 214 is partially mounted to the top support 254, the slider 214 will rotate towards the right side along with the top support 254. When the voltage is reduced, the top support 254 and slider 214 will rotate back to their original position of FIG. 14a. Because the slider 214 is rotatable about the weak point 260 in both directions, a big head displacement and fine head position adjustment may be achieved.

FIGS. 15a, 15b, and 14a-14c illustrate another embodiment of an operation method of the PZT micro-actuator 212 for performing a position adjustment function. Specifically, FIG. 15a illustrates another embodiment of an electrical connection structure between the two PZT portions 262, 266 of the PZT micro-actuator 212, and FIG. 15b illustrates the operation voltage. As illustrated, the PZT portions 262, 266 have the same polarization directions with a common ground. Also, two opposed sine waveform voltages are applied to the PZT portions 262, 266 to operate the PZT portions 262, 266. FIG. 14a illustrates the initial stage or original position of the PZT micro-actuator 212 and slider 214 when no voltage is applied to the PZT portions 262, 266 of the PZT micro-actuator 212. As shown in FIG. 14b, when the drive voltage goes to the first half period, the voltage increase causes the PZT portion 266 to shrink and the PZT portion 262 to extend. This movement of the PZT portions 262, 266 causes the top support 254 to rotate towards the left side about the weak point 260. Since slider 214 is partially mounted to the top support 254, the slider 214 will rotate towards the left side along with the top support 254. When the voltage is reduced, the top support 254 and slider 214 will rotate back to their original position of FIG. 14a. As shown in FIG. 14c, when the drive voltage goes to the second half period, the voltage increase (in the negative side) causes the PZT portion 266 to extend and the PZT portion 262 to shrink. This movement of the PZT portions 262, 266 causes the top support 254 to rotate towards the right side about the weak point 260. Since the slider 214 is partially mounted to the top support 254, the slider 214 will rotate towards the right side along with the top support 254. When the voltage is reduced, the top support 254 and slider 214 will rotate back to their original position of FIG. 14a. Similar to the above embodiment, the slider 214 is rotatable about the weak point 260 to attain fine head position adjustment.

FIGS. 16 and 17 illustrate resonance testing data of the PZT micro-actuator 212. FIG. 16 illustrates a resonance gain and FIG. 17 illustrates a resonance phase. As illustrated, the curves 282 and 286 illustrate the resonance gain and phase when the suspension base plate is shaken or excited, and the curves 284 and 288 illustrate the resonance gain and phase when the PZT portions 262, 264 of the PZT micro-actuator 212 are excited. The data illustrates that the PZT micro-actuator 212 does not have a suspension resonance model in operation like prior models. Thus, the PZT micro-actuator 212 greatly improves the performance characteristics of the disk drive device, e.g., improved head off-track stability and improved servo bandwidth of the disk drive device.

Figure 20:
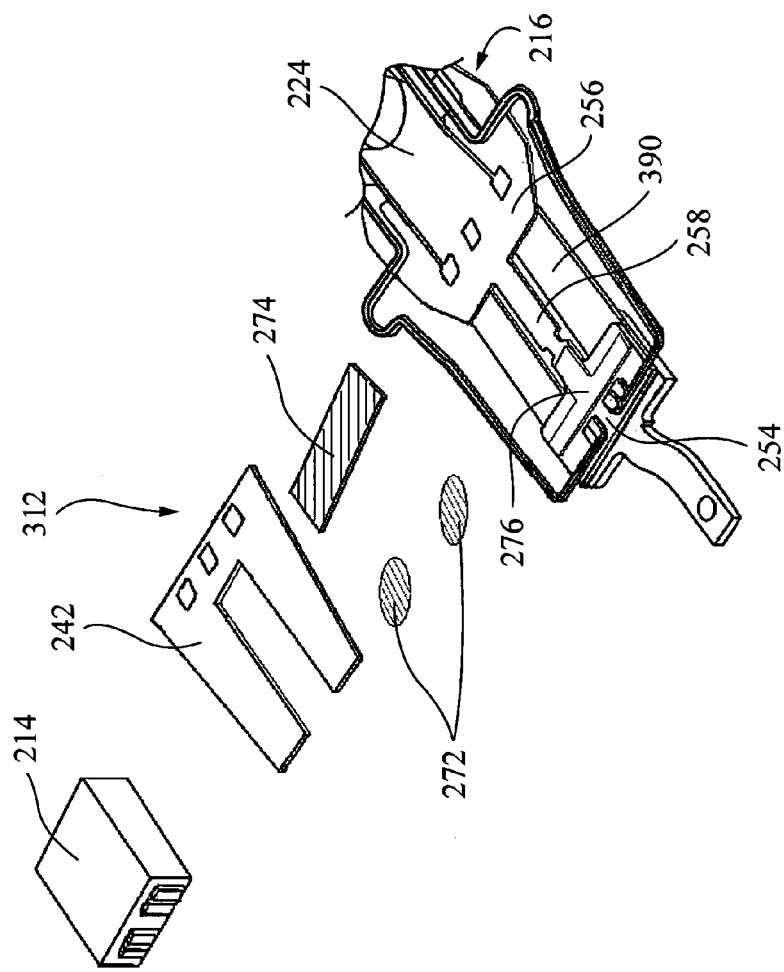
FIG. 20 is an exploded view of the HGA shown in FIG. 18.
Figure 18:
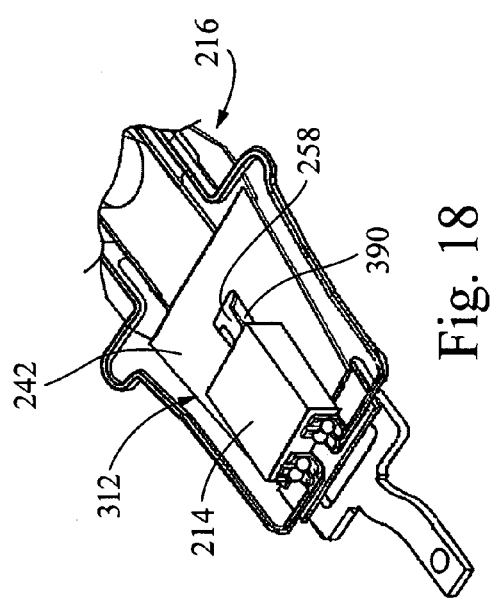
FIG. 18 is a partial perspective view of a HGA including a PZT micro-actuator according to another embodiment of the present invention.
Figure 19:
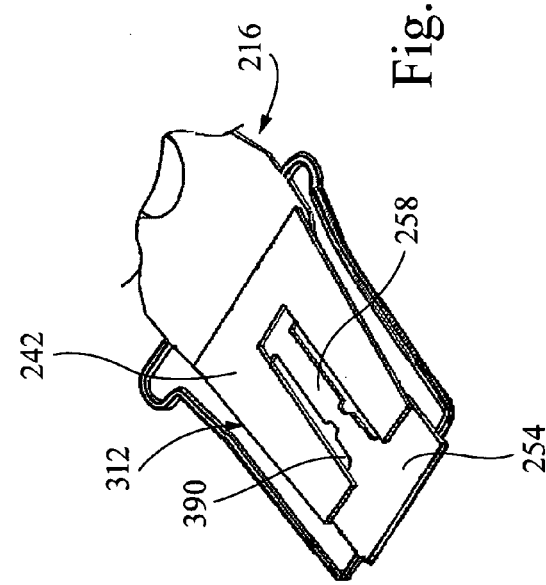
FIG. 19 is a partial perspective view of the HGA shown in FIG. 18 with the slider removed.

FIGS. 18-20 illustrate a PZT micro-actuator 312 according to another exemplary embodiment of the present invention. In this embodiment, a thin polymer layer 390 is provided to a back side of the leading beam 258. The polymer layer 390 may have a thickness in the range of 5-20 μm. The polymer layer 390 is structured to prevent deformation of the leading beam 258 in use. The remaining components of the PZT micro-actuator 312 are substantially similar to the PZT micro-actuator 212 and indicated with similar reference numerals. Although structurally different, the PZT micro-actuator 312 has a substantially similar work principle as the PZT micro-actuator 212.

Figure 21:
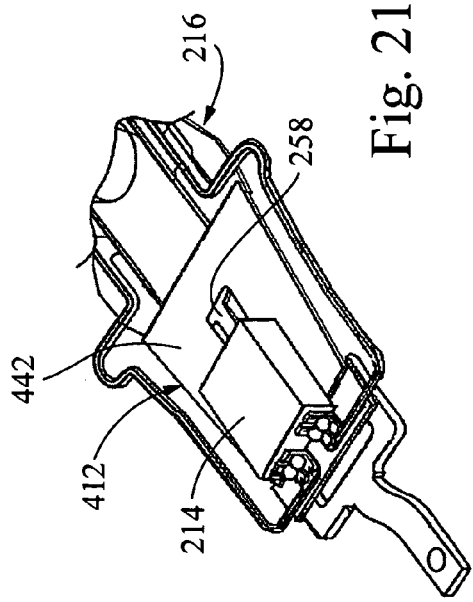
FIG. 21 is a partial perspective view of a HGA including a PZT micro-actuator according to another embodiment of the present invention.
Figure 23:
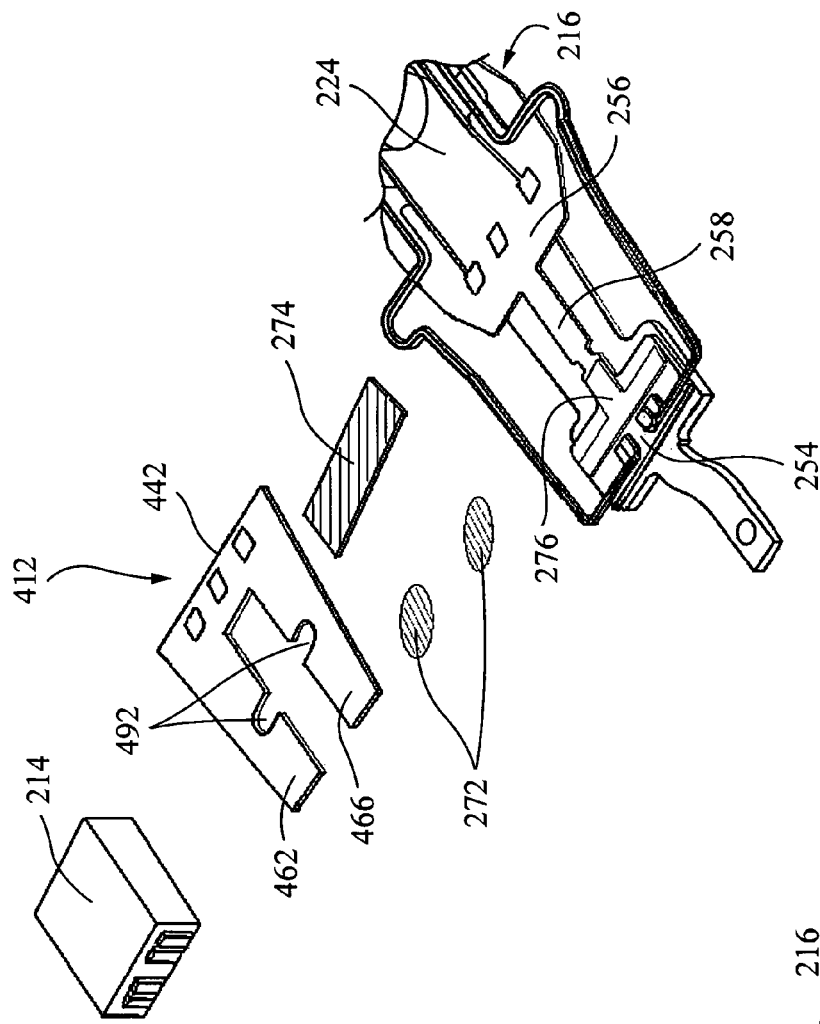
FIG. 23 is an exploded view of the HGA shown in FIG. 21.
Figure 22:
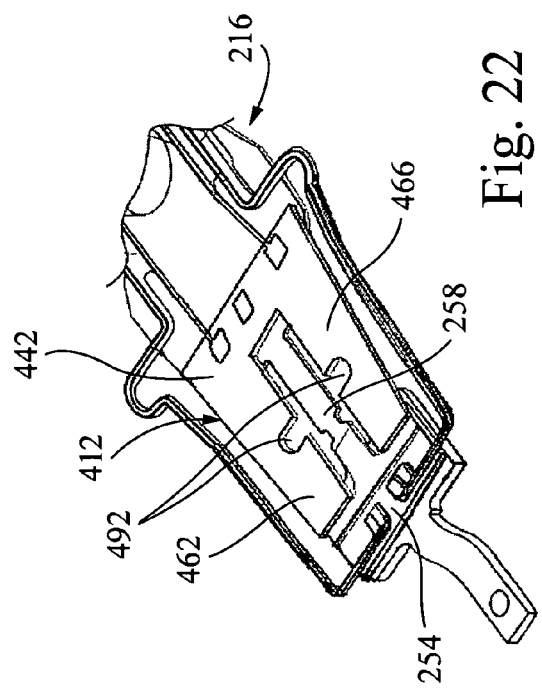
FIG. 22 is a partial perspective view of the HGA shown in FIG. 21 with the slider removed.

FIGS. 21-23 illustrate a PZT micro-actuator 412 according to another exemplary embodiment of the present invention. In this embodiment, each PZT portion 462, 466 of the PZT element 442 includes a notch 492 on the inner side thereof. The notches 492 improve the displacement performance of the PZT portions 462, 466 and prevent bending motion of the slider 214 in use. The remaining components of the PZT micro-actuator 412 are substantially similar to the PZT micro-actuator 212 and indicated with similar reference numerals. Although structurally different, the PZT micro-actuator 412 has a substantially similar work principle as the PZT micro-actuator 212.

FIGS. 24-26 illustrate a PZT micro-actuator 512 according to another exemplary embodiment of the present invention. In this embodiment, each PZT portion 562, 566 of the PZT element 542 includes a notch 592 on the outer side thereof. The notches 592 improve the displacement performance of the PZT portions 562, 566 and prevent bending motion of the slider 214 in use. The remaining components of the PZT micro-actuator 512 are substantially similar to the PZT micro-actuator 212 and indicated with similar reference numerals. Although structurally different, the PZT micro-actuator 512 has a substantially similar work principle as the PZT micro-actuator 212.

FIG. 27a illustrates the PZT element 442 shown in FIGS. 21-23 with a notch location length L, and FIG. 27b illustrates the PZT element 542 shown in FIGS. 24-26 with a notch location length L. FIG. 27c shows testing data or stroke simulation data of displacement versus notch location length for the PZT elements 442 and 542 shown in FIGS. 27a and 27b. As illustrated, the PZT element 542 with notches 592 on the outer side of the PZT portions 562, 566 provides more displacement or a bigger stroke in use.

Figure 28:
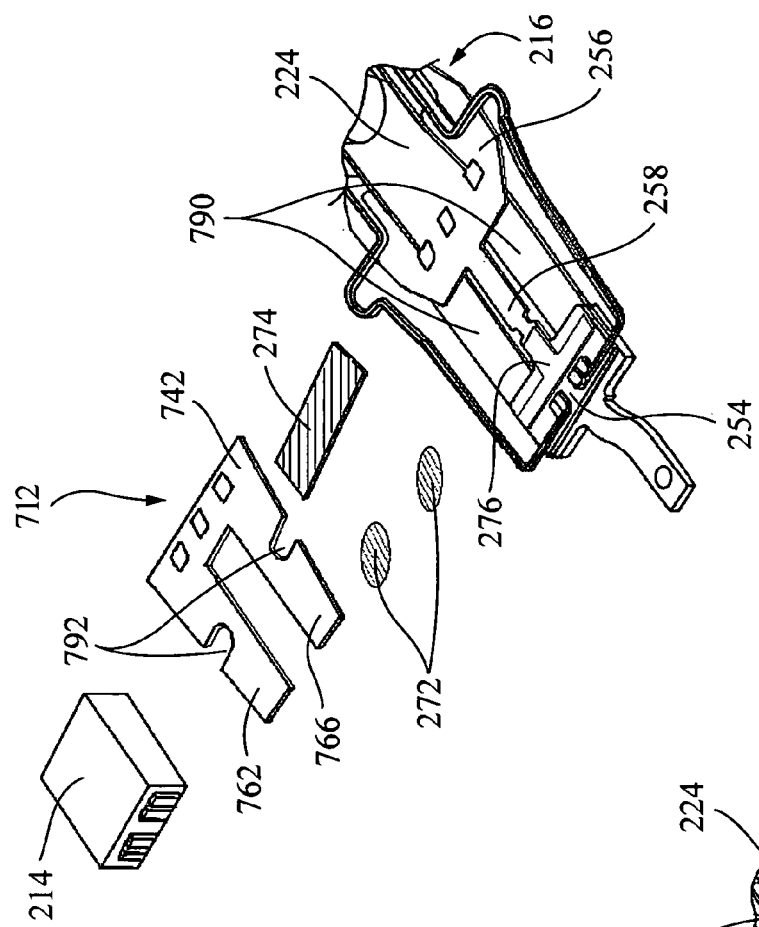
FIG. 28 is an exploded view of a HGA including a PZT micro-actuator according to another embodiment of the present invention.

FIG. 28 illustrate a PZT micro-actuator 612 according to another exemplary embodiment of the present invention. In this embodiment, each PZT portion 662, 666 of the PZT element 642 includes a notch 692 on the inner side thereof. The notches 692 improve the displacement performance of the PZT portions 662, 666 and prevent bending motion of the slider 214 in use. Also, a thin polymer layer 690 is provided to a back side of the leading beam 258. The polymer layer 690 may have a thickness in the range of 5-20 μm. The polymer layer 690 is structured to prevent deformation of the leading beam 258 in use. The remaining components of the PZT micro-actuator 612 are substantially similar to the PZT micro-actuator 212 and indicated with similar reference numerals. Although structurally different, the PZT micro-actuator 612 has a substantially similar work principle as the PZT micro-actuator 212.

Figure 29:
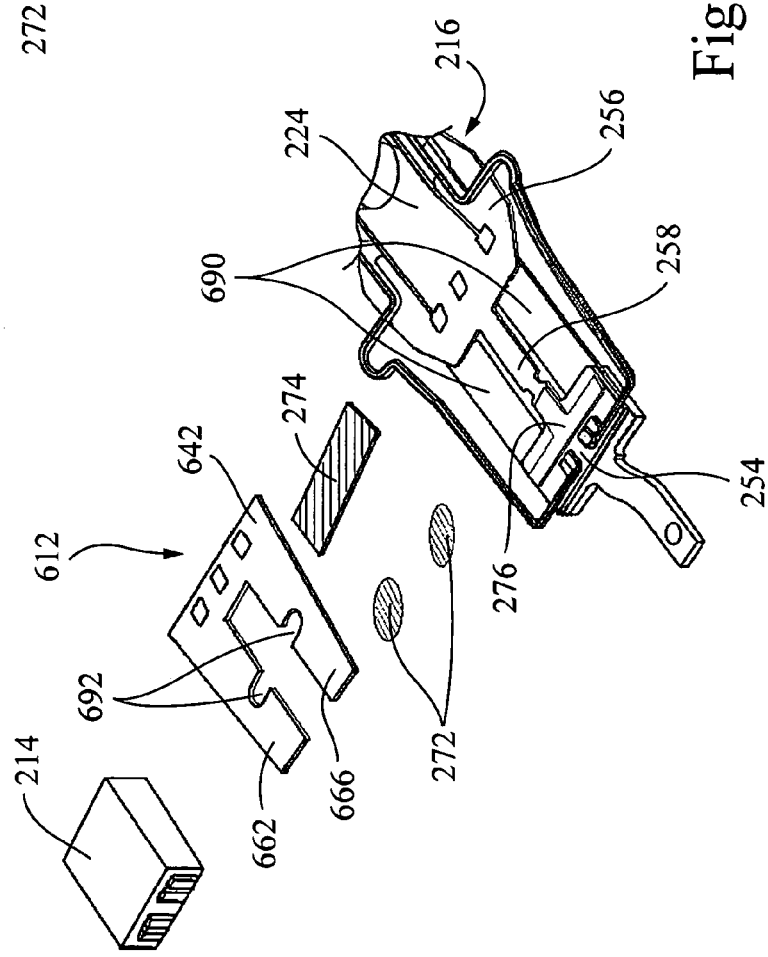
FIG. 29 is an exploded view of a HGA including a PZT micro-actuator according to another embodiment of the present invention.

FIG. 29 illustrate a PZT micro-actuator 712 according to another exemplary embodiment of the present invention. In this embodiment, each PZT portion 762, 766 of the PZT element 742 includes a notch 792 on the outer side thereof. The notches 792 improve the displacement performance of the PZT portions 762, 766 and prevent bending motion of the slider 214 in use. Also, a thin polymer layer 790 is provided to a back side of the leading beam 258. The polymer layer 790 may have a thickness in the range of 5-20 μm. The polymer layer 790 is structured to prevent deformation of the leading beam 258 in use. The remaining components of the PZT micro-actuator 712 are substantially similar to the PZT micro-actuator 212 and indicated with similar reference numerals. Although structurally different, the PZT micro-actuator 712 has a substantially similar work principle as the PZT micro-actuator 212.

A head gimbal assembly 210 incorporating a PZT micro-actuator 212, 312, 412, 512, 612, 712 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a support structure including
        a bottom support integral with a suspension flexure of the head gimbal assembly,
        a top support adapted to support a slider of the head gimbal assembly, and
        a leading beam that couples the bottom support and the top support, the leading beam including a weak point that allows the top support to rotate about a rotational axis in use; and
    a PZT element mounted between the top and bottom supports, the PZT element being excitable to cause selective rotational movement of the top support about the rotational axis in use,
    wherein the PZT element includes a first PZT portion, a second PZT portion, and a coupling portion that couples the first and second PZT portions.

2. The micro-actuator according to claim 1, wherein the PZT element is a thin-film PZT element, ceramic single crystal, or PMN-PT single crystal.

3. The micro-actuator according to claim 1, wherein the top support and the leading beam define a T-shaped arrangement.

4. The micro-actuator according to claim 1, wherein the first and second PZT portions are mounted to the top support and the coupling portion is mounted to the bottom support.

5. The micro-actuator according to claim 4, wherein the first and second PZT portions are partially mounted to the top support by epoxy dots.

6. The micro-actuator according to claim 4, wherein the coupling portion is partially mounted to the bottom support by anisotropic conductive film (ACF).

7. The micro-actuator according to claim 6, wherein the coupling portion of the PZT element includes multiple bonding pads and the bottom support includes multiple bonding pads communicated with suspension traces of the suspension flexure, the multiple bonding pads of the coupling portion being electrically connected to the multiple bonding pads of the bottom support by the ACF.

8. The micro-actuator according to claim 4, wherein each of the first and second PZT portions include a notch on an inner side thereof.

9. The micro-actuator according to claim 4, wherein each of the first and second PZT portions include a notch on an outer side thereof.

10. The micro-actuator according to claim 4, further comprising a polymer layer provided to the leading beam.

11. The micro-actuator according to claim 10, wherein each of the first and second PZT portions include a notch on an inner side thereof.

12. The micro-actuator according to claim 10, wherein each of the first and second PZT portions include a notch on an outer side thereof.

13. The micro-actuator according to claim 1, wherein the first and second PZT portions have the same polarization direction.

14. The micro-actuator according to claim 1, wherein the first and second PZT portions have opposite polarization directions.

15. The micro-actuator according to claim 1, wherein the PZT element is made of a single-layer PZT material or a multi-layer PZT material.

16. The micro-actuator according to claim 1, wherein the top support includes a step constructed of a polymer laminate to support the slider.

17. The micro-actuator according to claim 1, further comprising a polymer layer provided to the leading beam.

18. A head gimbal assembly comprising:
    a micro-actuator;
    a slider; and
    a suspension including a suspension flexure,
    wherein the micro-actuator includes:
        a support structure including
            a bottom support integral with the suspension flexure,
            a top support that supports the slider, and
            a leading beam that couples the bottom support and the top support, the leading beam including a weak point that allows the top support to rotate about a rotational axis in use; and
        a PZT element mounted between the top and bottom supports, the PZT element being excitable to cause selective rotational movement of the top support about the rotational axis in use,
        wherein the PZT element includes a first PZT portion, a second PZT portion, and a coupling portion that couples the first and second PZT portions.

19. The head gimbal assembly according to claim 18, wherein the PZT element is a thin-film PZT element, ceramic single crystal, or PMN-PT single crystal.

20. The head gimbal assembly according to claim 18, wherein the suspension includes a load beam, the load beam having a dimple that engages the weak point of the leading beam.

21. The head gimbal assembly according to claim 20, wherein a center of the slider, the weak point, and the dimple are aligned along a common axis.

22. The head gimbal assembly according to claim 18, wherein the top support includes a step constructed of a polymer laminate to support the slider.

23. The head gimbal assembly according to claim 22, wherein the slider is partially mounted on the step by epoxy or adhesive.

24. The head gimbal assembly according to claim 22, wherein a parallel gap is provided between the slider and the PZT element.

25. The head gimbal assembly according to claim 18, wherein the top support and the leading beam define a T-shaped arrangement.

26. The head gimbal assembly according to claim 18, wherein the first and second PZT portions are mounted to the top support and the coupling portion is mounted to the bottom support.

27. The head gimbal assembly according to claim 26, wherein the first and second PZT portions are partially mounted to the top support by epoxy dots.

28. The head gimbal assembly according to claim 26, wherein the coupling portion is partially mounted to the bottom support by anisotropic conductive film (ACF).

29. The head gimbal assembly according to claim 28, wherein the coupling portion of the PZT element includes multiple bonding pads and the bottom support includes multiple bonding pads communicated with suspension traces of the suspension flexure, the multiple bonding pads of the coupling portion being electrically connected to the multiple bonding pads of the bottom support by the ACF.

30. The head gimbal assembly according to claim 26, wherein each of the first and second PZT portions include a notch on an inner side thereof.

31. The head gimbal assembly according to claim 26, wherein each of the first and second PZT portions include a notch on an outer side thereof.

32. The head gimbal assembly according to claim 26, further comprising a polymer layer provided to the leading beam.

33. The head gimbal assembly according to claim 32, wherein each of the first and second PZT portions include a notch on an inner side thereof.

34. The head gimbal assembly according to claim 32, wherein each of the first and second PZT portions include a notch on an outer side thereof.

35. The head gimbal assembly according to claim 18, wherein the first and second PZT portions have the same polarization direction.

36. The head gimbal assembly according to claim 18, wherein the first and second PZT portions have opposite polarization directions.

37. The head gimbal assembly according to claim 18, wherein the PZT element is made of a single-layer PZT material or a multi-layer PZT material.

38. The head gimbal assembly according to claim 18, further comprising a polymer layer provided to the leading beam.

39. A disk drive device comprising:
a head gimbal assembly including a micro-actuator, a slider, and a suspension including a suspension flexure;
a drive arm connected to the head gimbal assembly;
a disk; and
a spindle motor operable to spin the disk,
wherein the micro-actuator includes:
a support structure including
a bottom support integral with the suspension flexure,
a top support that supports the slider, and
a leading beam that couples the bottom support and the top support, the leading beam including a weak point that allows the top support to rotate about a rotational axis in use; and
a PZT element mounted between the top and bottom supports, the PZT element being excitable to cause selective rotational movement of the top support about the rotational axis in use,
wherein the PZT element includes a first PZT portion, a second PZT portion, and a coupling portion that couples the first and second PZT portions.

40. A head gimbal assembly comprising:
a micro-actuator;
a slider; and
a suspension including a suspension flexure,
the micro-actuator includes:
a support structure including
a bottom support integral with the suspension flexure,
a top support that supports the slider, and
a leading beam that couples the bottom support and the top support, the leading beam including a weak point that allows the top support to rotate about a rotational axis in use; and
a PZT element mounted between the top and bottom supports, the PZT element being excitable to cause selective rotational movement of the top support about the rotational axis in use,
wherein the suspension includes a load beam having a dimple that engages the weak point of the leading beam, and wherein a center of the slider, the weak point, and the dimple are aligned along a common axis.

41. The head gimbal assembly according to claim 40, wherein the top support includes a step constructed of a polymer laminate to support the slider.

42. The head gimbal assembly according to claim 41, wherein the slider is partially mounted on the step by epoxy or adhesive.

43. The head gimbal assembly according to claim 41, wherein a parallel gap is provided between the slider and the PZT element.

44. A method for manufacturing a head gimbal assembly, comprising:
forming a micro-actuator support structure integral with a suspension flexure;
applying a bonding material to the micro-actuator support structure;
aligning a PZT element with the micro-actuator support structure, the PZT element including a first PZT portion, a second PZT portion, and a coupling portion that couples the first and second PZT portions;
bonding the PZT element to the micro-actuator support structure by the bonding material to physically and electrically connect the PZT element to suspension traces provided on the micro-actuator support structure;
mounting a slider to the micro-actuator support structure;
electrically connecting the slider to suspension traces provided on the micro-actuator support structure; and
performing a resistance check and a visual check.

45. The method according to claim 44, wherein applying a bonding material includes applying ACF and epoxy to the micro-actuator support structure.

* * * * *